United States Patent [19]
Patterson, Jr.

[11] Patent Number: 5,998,735
[45] Date of Patent: Dec. 7, 1999

[54] SAFETY DEVICE FOR AN ELECTRICAL OUTLET

[76] Inventor: Paul Leroy Patterson, Jr., ACU-5 R-1, Box 555161, Camp Pendleton, Calif. 92055

[21] Appl. No.: 09/128,614

[22] Filed: Aug. 3, 1998

[51] Int. Cl.⁶ .................................................. H02G 3/14
[52] U.S. Cl. .............................. 174/67; 220/242; 439/135
[58] Field of Search ................................. 174/66, 67, 53; 220/3.8, 241, 242; 439/135, 195

[56] References Cited

U.S. PATENT DOCUMENTS

| | | |
|---|---|---|
| 3,068,442 | 12/1962 | Kubik et al. . |
| 4,640,564 | 2/1987 | Hill .......................................... 439/137 |
| 4,733,017 | 3/1988 | Wolfe-Taylor et al. .................. 174/67 |
| 4,793,818 | 12/1988 | Poirier ...................................... 439/140 |
| 4,801,271 | 1/1989 | Piper ........................................ 439/148 |
| 5,107,075 | 4/1992 | Currier, Jr. . |
| 5,212,347 | 5/1993 | Powers et al. ............................ 174/67 |
| 5,456,373 | 10/1995 | Food ........................................ 220/242 |
| 5,563,373 | 10/1996 | Doroslovac . |
| 5,571,995 | 11/1996 | Pierce . |
| 5,675,126 | 10/1997 | Halvorsen . |
| 5,703,329 | 12/1997 | DeLone .................................... 174/67 |

*Primary Examiner*—Kristine Kincaid
*Assistant Examiner*—Dhiru R Patel
*Attorney, Agent, or Firm*—Michael I. Kroll

[57] ABSTRACT

A safety device (14) for an electrical outlet (16) including a back cover plate (32) having a pair of vertically aligned apertures (34), (36) therethrough. A pair of shields (40), (42) are sized to obstruct the apertures (34), (36) in the back cover plate (32), to prevent access to dual sockets (24), (26) of a receptacle (22). A structure (44) on a front face (46) of the back cover plate (32) is for guiding the upper shield (40) to move upwardly away from the upper aperture (34) and the lower shield (42) to move downwardly away from the lower aperture (36) in the back cover plate (32). Components (48) are for biasing the shields (40), (42) on the front face (46) of the back cover plate (32). A front cover plate (50) has a pair of vertically aligned apertures (52), (54) therethrough. Elements (58) are for mating the front cover plate (50) to the back cover plate (32) cover the shields (40), (42). A facility (60) is for engaging the upper shield (40) through the upper aperture (52) in the front cover plate (50) and move it upwardly away from the upper aperture (34) in the back cover plate (32). A facility (62) is for engaging the lower shield (42) through the lower aperture (54) in the front cover plate (50) and move it downwardly away from the lower aperture (36) in the back cover plate (32).

19 Claims, 13 Drawing Sheets

SAFETY DEVICE FOR AN ELECTRICAL OUTLET

BACKGROUND OF THE INVENTION

1. Field of the Invention

The instant invention relates generally to electrical outlet guard covers and more specifically it relates to a safety device for an electrical outlet. The safety device for an electrical outlet will replace an existing cover plate of the electrical outlet, so as to cover the hazardous slots of the receptacle and yet appear very similar to the electrical outlet. An adult will have easy access to the receptacle, but it would be difficult for a child to gain access to the receptacle. This will help prevent the child from plugging in appliances that are dangerous to use, such as an electric knife, a can opener or a microwave oven, to name a few.

2. Description of the Prior Art

Numerous electrical outlet guard covers have been provided in prior art. For example, U.S. Pat. No. 3,068,442 to Kubik et al.; U.S. Pat. No. 5,107,075 to Currier, Jr.; U.S. Pat. No. 5,563,373 to Doroslovac; U.S. Pat. No. 5,571,995 to Pierce and U.S. Pat. No. 5,675,126 to Halvorsen all are illustrative of such prior art. While these units may be suitable for the particular purpose to which they address, they would not be as suitable for the purposes of the present invention as heretofore described.

KUBIK, JOHN T.

KUBIK, STANLEY

SAFETY GUARD FOR WALL SOCKETS

U.S. Pat. No. 3,068,442

A safety guard for electrical wall sockets comprising a box-like enclosure dimensioned to fit over the face plate of a wall socket of the type having a pair of vertically aligned sockets. The enclosure has a front wall extending parallel to and spaced outwardly from the face plate. The front wall has a pair of socket openings aligned with the sockets. A slide member is mounted for sliding vertical movement within the enclosure. The slide member has a pair of elongated arms extending vertically adjacent to the sides of the enclosure. The slide member has a pair of shorter arms spaced inwardly from the elongated arms. The space between the arms form a pair of elongated vertically directed slots. An upper bar is normally disposed in overlying relationship to the upper of the socket openings. The upper edge of the upper bar engages the lower ends of the shorter arms. The upper bar has a pair of horizontally directed bosses extending outwardly along its lower edge. A pair of studs extend from the front wall of the enclosure toward the face plate within the slots. A pair of normally contracted coil springs are mounted within the slots. The springs extend between the studs and bosses. A lower bar is normally disposed in overlying relationship to the lower of the socket openings. The upper edge of the lower bar engages the lower ends of the elongated arms. A second pair of studs extend from the front wall toward the face plate. The lower bar has a pair of slots adjacent its ends. A pair of normally contracted coil springs are mounted within the slots. The springs extend between the second pair of studs and the lower bar. There being free areas above each of the bars. The slide member is movable downwardly to move the bars away from the socket openings and bring the free areas into alignment with the socket openings. Each of the bars upon the release of the slide member is held in a downward position if a plug is inserted in its socket opening and is free for independent return movement to its normal position by the urging of the springs if no plug is inserted in its opening.

CURRIER, JR., DONALD J.

SLIDABLE SAFETY COVER FOR ELECTRICAL OUTLETS

U.S. Pat. No. 5,107,075

An improved slidable safety cover for use with electrical outlets is disclosed in which at least one slidable cover member is movably mounted on an apertured stationary frame overlaying an electrical outlet. The slidable cover member is movable between an open position at which access to underlaying electrical outlets is available through the slidable safety cover and a closed position at which access to the electrical outlets is blocked by the slidable cover member. Movement of the slidable cover member from the closed position to the open position requires release of a locking mechanism comprising at least one resilient finger latch member having a first end portion anchored to the stationary frame and a second end portion partially protruding through the slidable cover member. A finger latch opening is provided in the slidable cover member and is located distal from all sides of the safety cover slidable cover member.

DOROSLOVAC, SLOBODAN

SAFETY SHIELD FOR ELECTRICAL OUTLET

U.S. Pat. No. 5,563,373

A safety device replaces the cover plate of a wall-mounted electrical outlet box having a pair of female receptacles for receiving a male plug. The safety device has a face plate, a back plate, a pair of shutters and a biasing means. The face plate has two large apertures in it, corresponding to the two female receptacles and exposing the receptacles when the face plate is positioned atop the outlet box and secured to it. The back plate has an inner surface and an outer surface and an aperture, which is shaped and positioned to correspond to the pair of female receptacles. When the front plate and back plate are mated, the front plate and the back plate are joined with the back face of the front plate, the inner surface of the back plate and a pair of parallel flanges on the back face defining a channel. First and second shutters, corresponding to each of the large apertures on the face plate, cover the apertures. Each shutter is an imperforate shield member with an arm extending from each side and is positioned slidably within the channel, so as to obstruct the corresponding large aperture completely when in a first position and to provide access to a male plug through the large aperture when in a second position. The shutters are biased into the closed first position by a biasing means, preferably a pair of rubber bands.

HALVORSEN, GARY

OUTLET COVER

U.S. Pat. No. 5,675,126

An outlet cover, for an electrical outlet, that is attachable over the electrical outlet itself or a face plate thereof. The outlet cover has a plate member with apertures for permitting access to sockets of the electrical outlet. Hinged doors swing to allow access to the sockets and to cover the sockets. A latch mechanism latches the doors shut over the sockets to eliminate an electrical shock hazard potential to children. The doors may be opened via an opening in a side surface of the outlet cover so positioned to be inconspicuous. The opening provides clearance for a prong, of an electrical plug, to be inserted therein to release the latch mechanism. Alternatively, a slot may be provided in the side surface to accept a human nail, a pencil point, or a pin that may be used to release the latch, either along or in conjunction with a further mechanism for acting on the latch mechanism. An embodiment of the invention has the doors configured to lie flush with a face surface of the outlet cover.

PIERCE, DAVID B.

LOCKING SAFETY COVER FOR ELECTRICAL OUTLETS

U.S. Pat. No. 5,571,995

A safety cover for electrical outlets includes a center locking block which is attached to an electrical outlet by a screw, and which has grooves to receive elongate members integral with individual receptacle covers. Matching cross-sectional shapes of the grooves and members fit closely so that elongate members are retained in the grooves. A flexible latching arm on the front of a receptacle cover engages the locking block to latch the cover in place. The latching arm is pressed aside with a fingertip to permit removal of the receptacle cover. One of the covers has prongs which engage openings in the receptacle to prevent the safety cover assembly from being rotated around the mounting screw.

SUMMARY OF THE INVENTION

A primary object of the present invention is to provide a safety device for an electrical outlet that will overcome the shortcomings of the prior art devices.

Another object is to provide a safety device for an electrical outlet that will replace an existing cover plate of the electrical outlet, so as to cover the hazardous slots of the receptacle and yet appear very similar to the electrical outlet.

An additional object is to provide a safety device for an electrical outlet in which an adult will have easy access to the receptacle, but would be difficult for a child to gain access to the receptacle, so as to help prevent the child from plugging in appliances that are dangerous to use, such as an electric knife, a can opener of a microwave oven, to name a few.

A further object is to provide a safety device for an electrical outlet that is simple and easy to use.

A still further object is to provide a safety device for an electrical outlet that is economical in cost to manufacture.

Further objects of the invention will appear as the description proceeds.

To the accomplishment of the above and related objects, this invention may be embodied in the form illustrated in the accompanying drawings, attention being called to the fact, however, that the drawings are illustrative only, and that changes may be made in the specific construction illustrated and described within the scope of the appended claims.

BRIEF DESCRIPTION OF THE DRAWING FIGURES

Various other objects, features and attendant advantages of the present invention will become more fully appreciated as the same becomes better understood when considered in conjunction with the accompanying drawings, in which like reference characters designate the same or similar parts throughout the several views, and wherein.

Similar reference characters denote corresponding features consistently throughout the attached drawings.

DETAILED DESCRIPTION OF THE PREFERRED EMBODIMENTS

Figure 1:
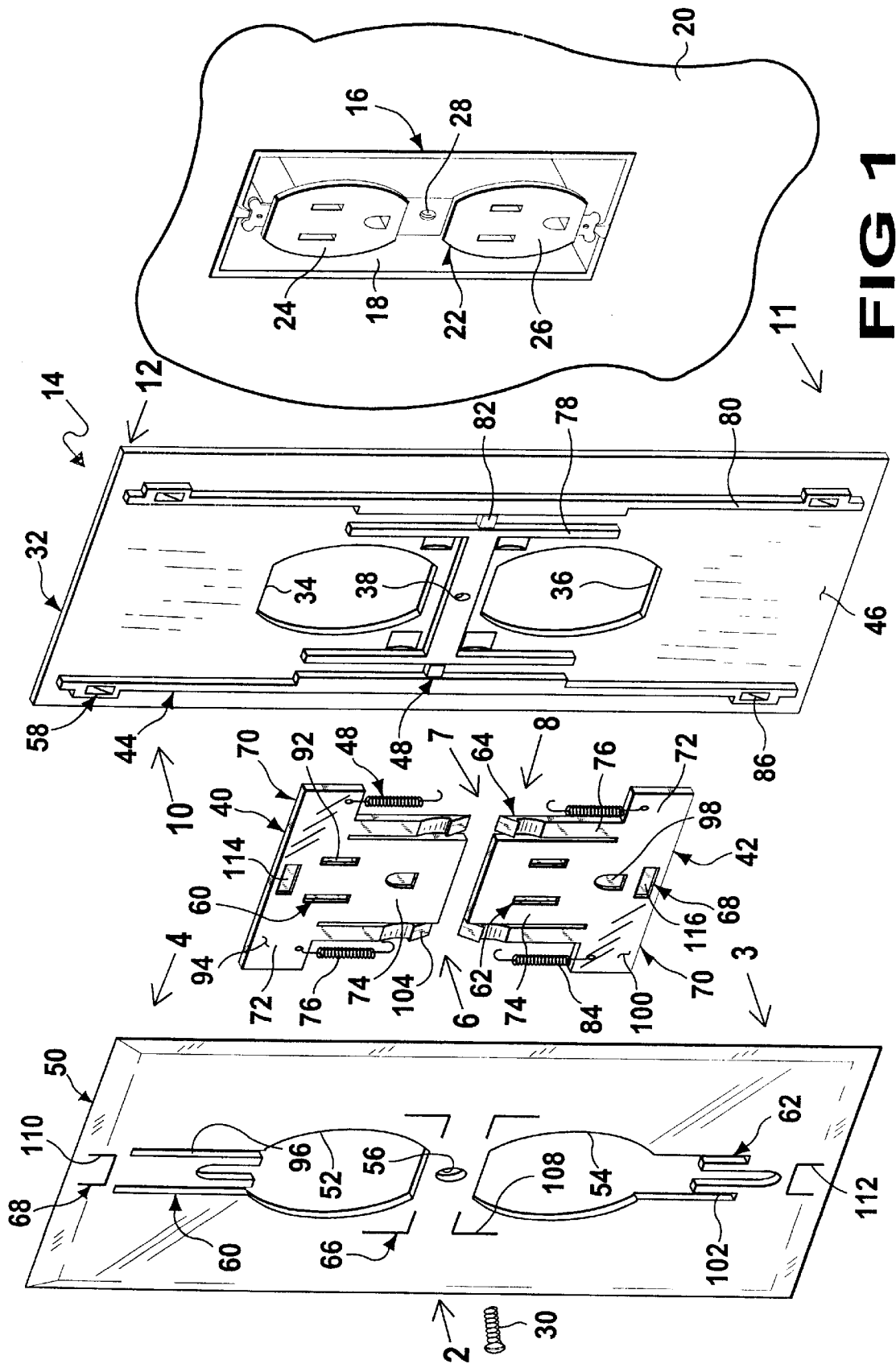
FIG. 1 is an exploded front perspective view of the present invention ready to be installed over a receptacle in an electrical outlet.
Figure 2:
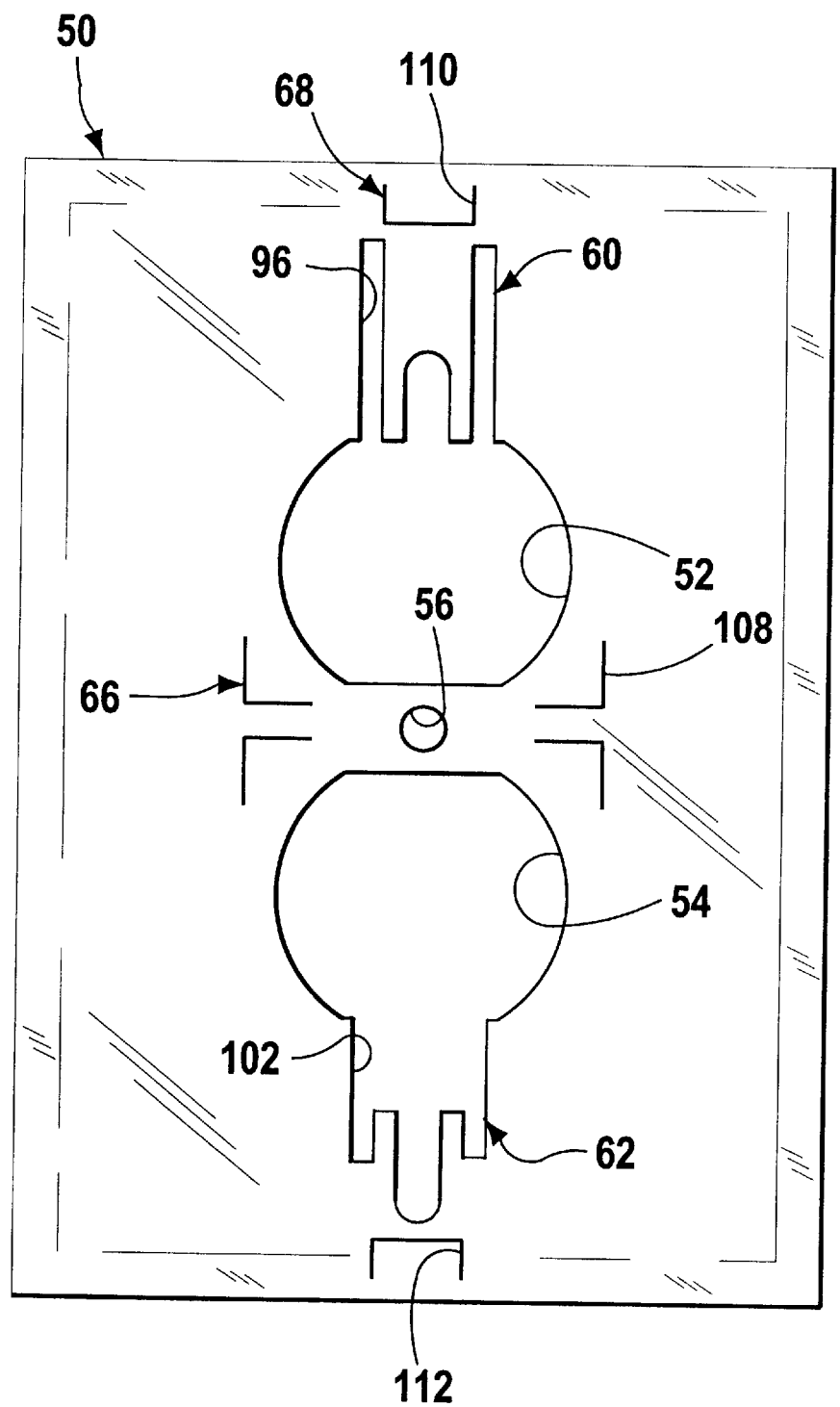
FIG. 2 is a front elevational view of the front cover plate taken in the direction of arrow 2 in FIG. 1.
Figure 3:
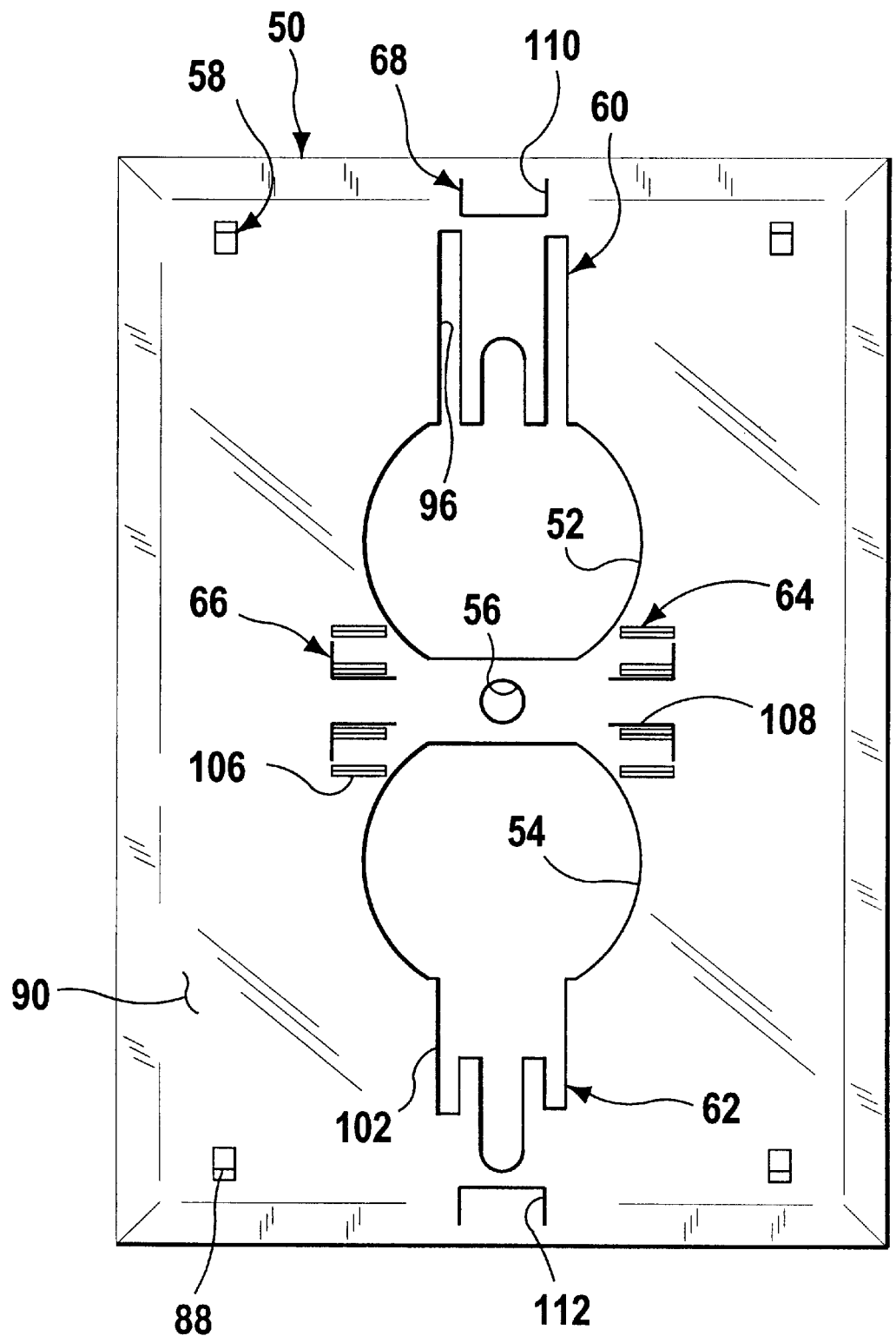
FIG. 3 is a rear elevational view of the front cover plate taken in the direction of arrow 3 in FIG. 1.
Figure 4:
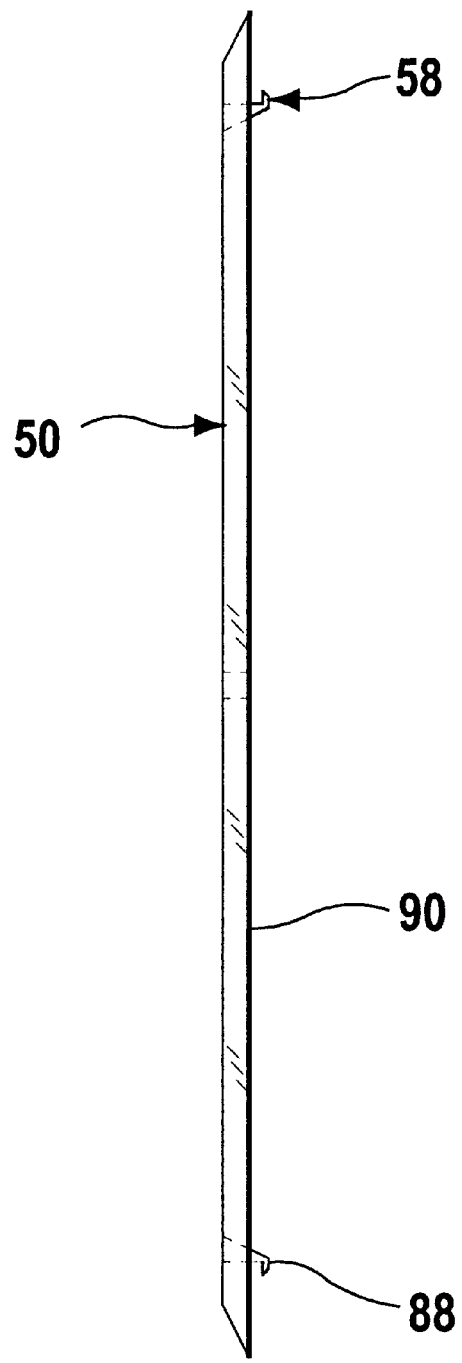
FIG. 4 is a side elevational view of the front cover plate taken in the direction of arrow 4 in FIG. 1.
Figure 5:
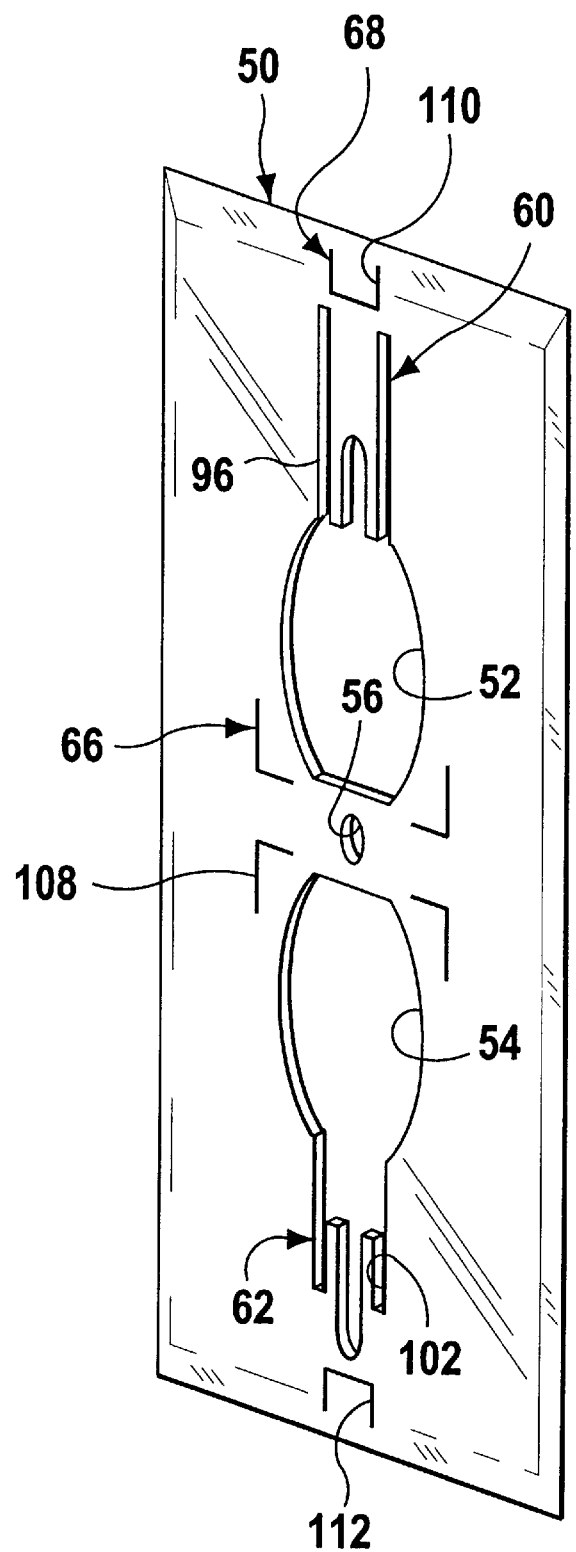
FIG. 5 is a front perspective view of the front cover plate.
Figure 6:
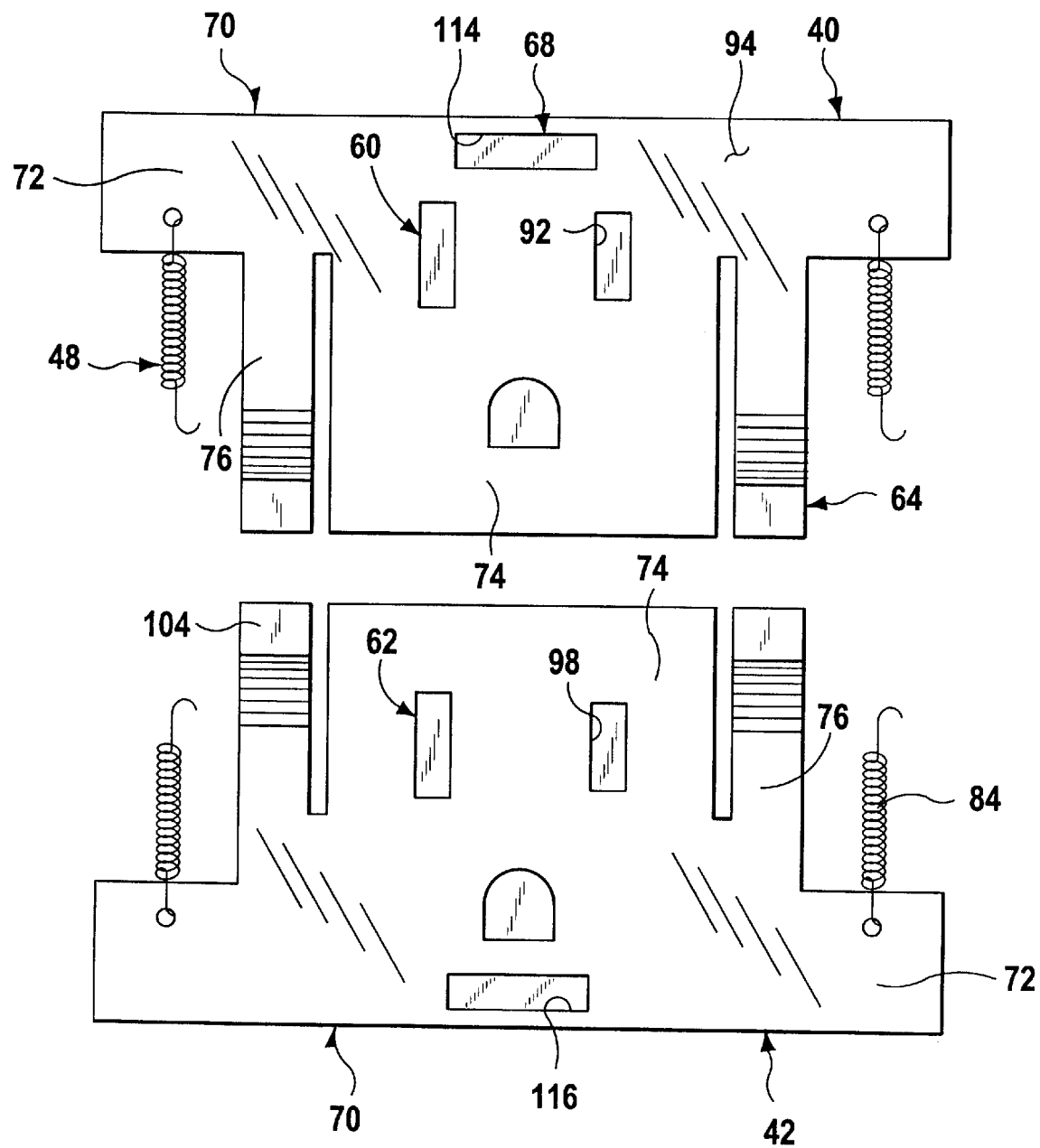
FIG. 6 is a front elevational view of the shields taken in the direction of arrow 6 in FIG. 1.
Figure 7:
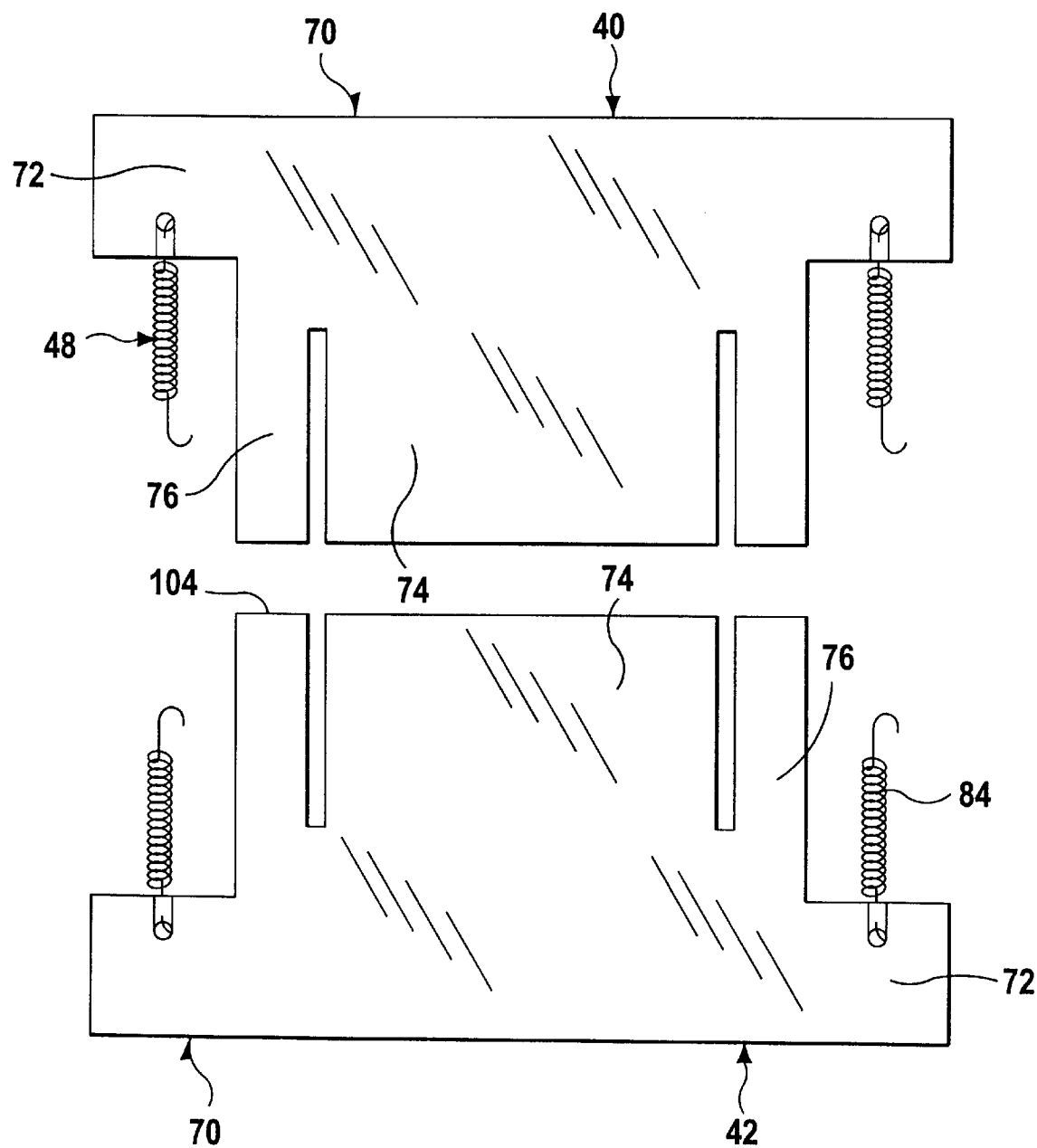
FIG. 7 is a rear elevational view of the two shields taken in the direction of arrow 7 in FIG. 1.
Figure 8:
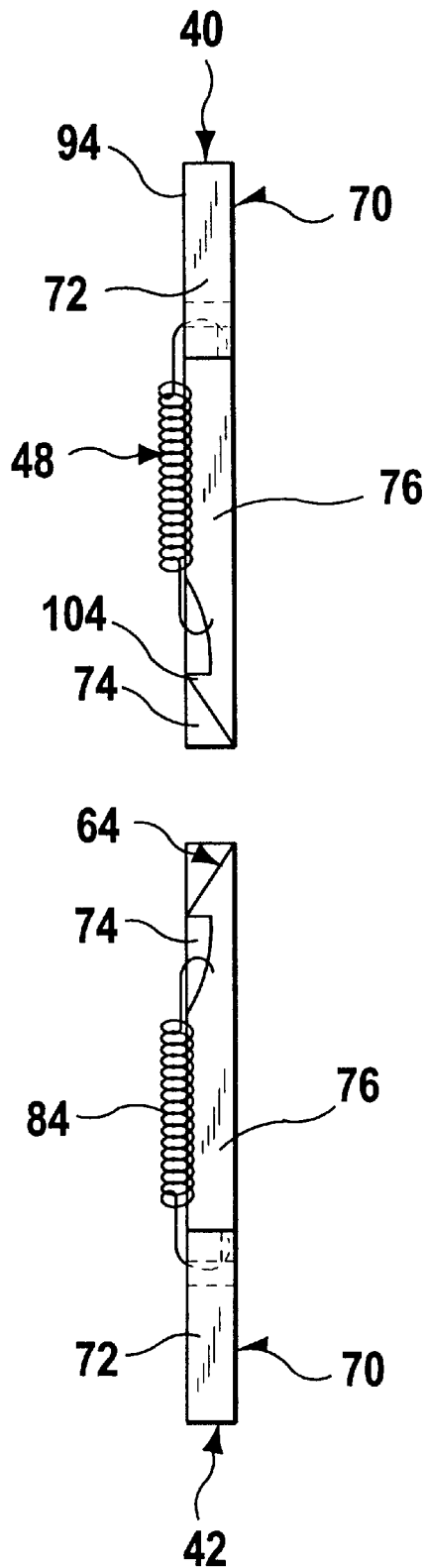
FIG. 8 is a side elevational view of the two shields taken in the direction of arrow 8 in FIG. 1.
Figure 9:
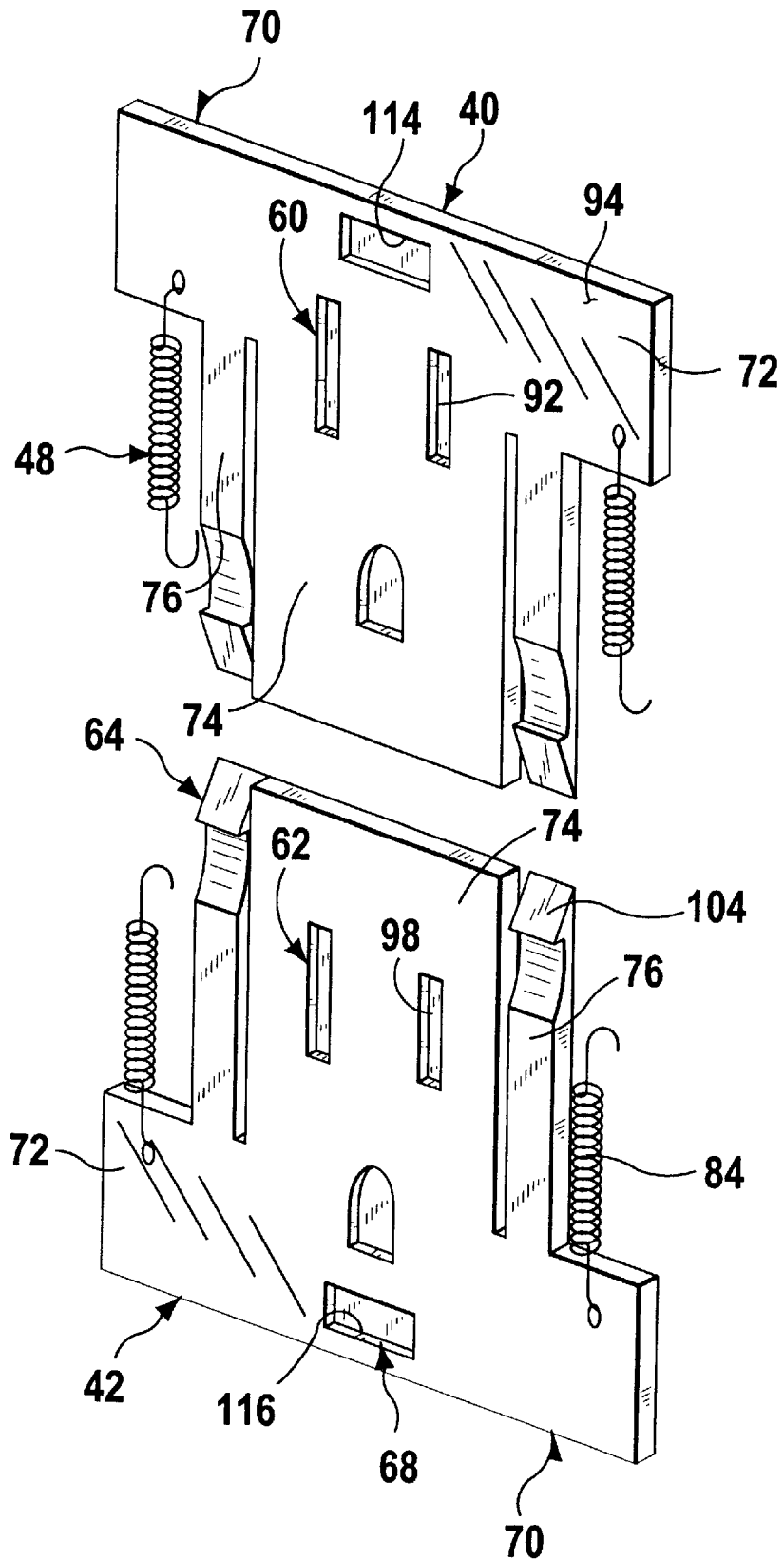
FIG. 9 is a front perspective view of the two shields.
Figure 10:
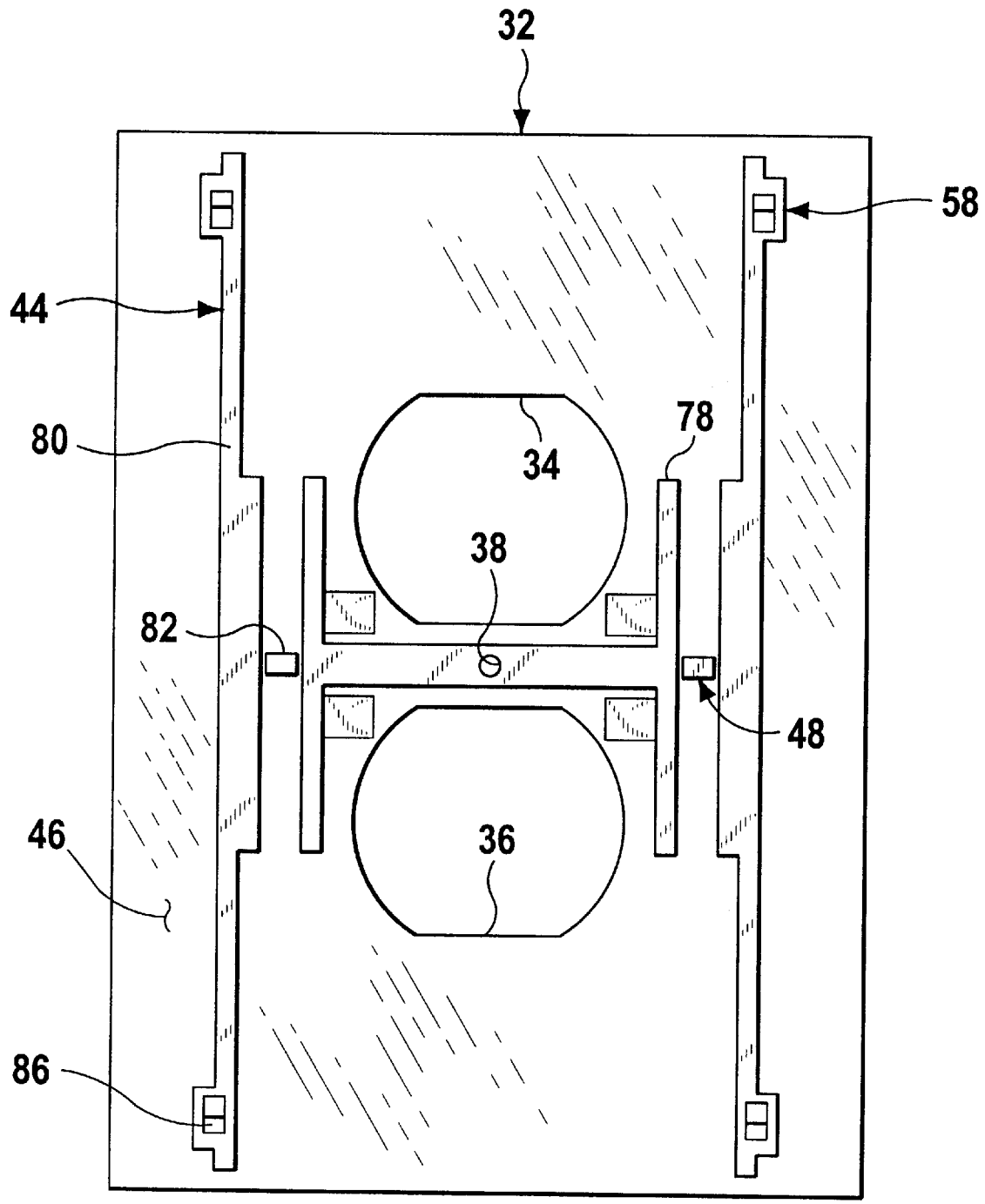
FIG. 10 is a front elevational view of the back cover plate taken in the direction of arrow 10 in FIG. 1.
Figure 11:
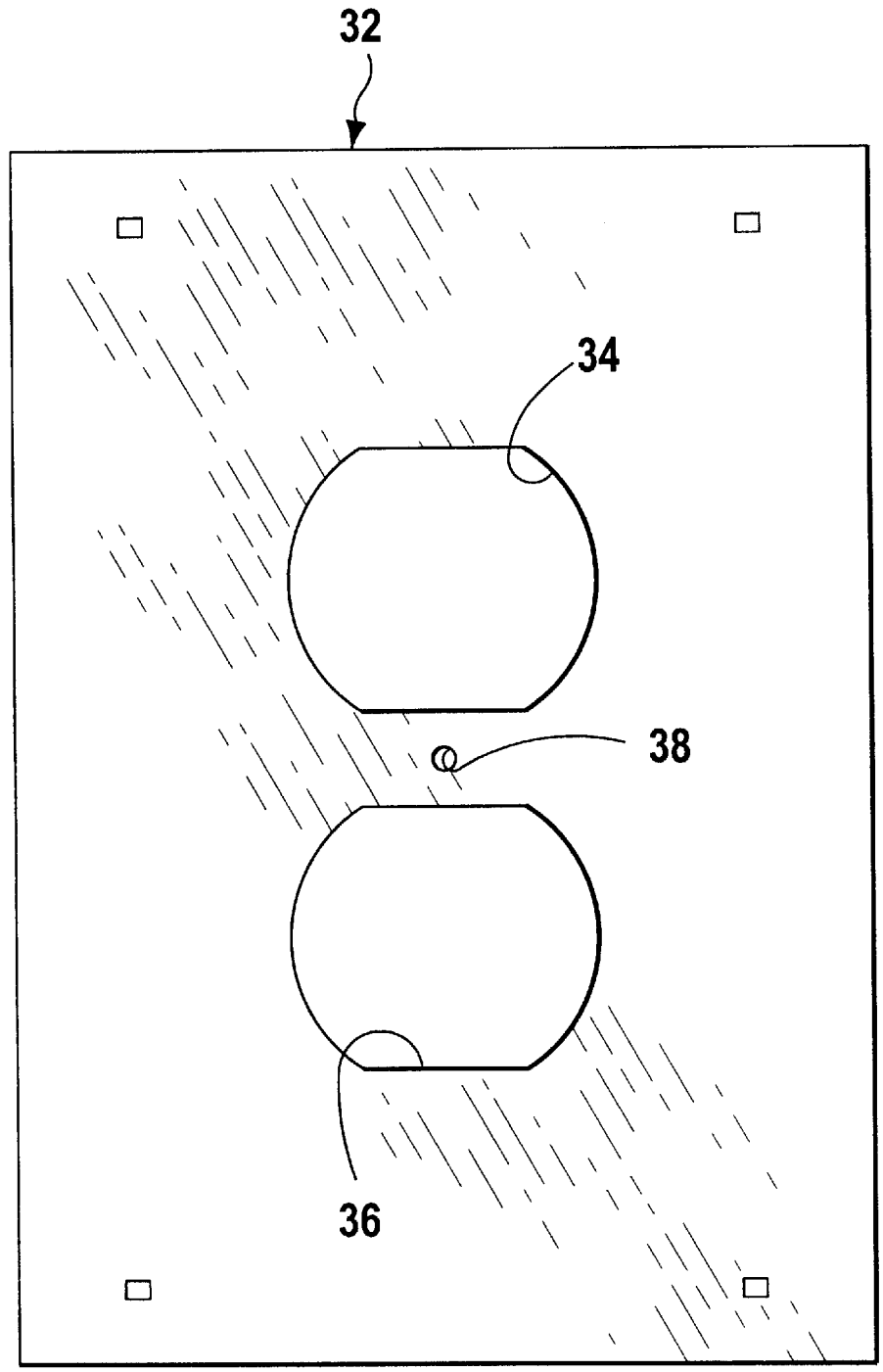
FIG. 11 is a rear elevational view of the back cover plate taken in the direction of arrow 11 in FIG. 1.
Figure 12:
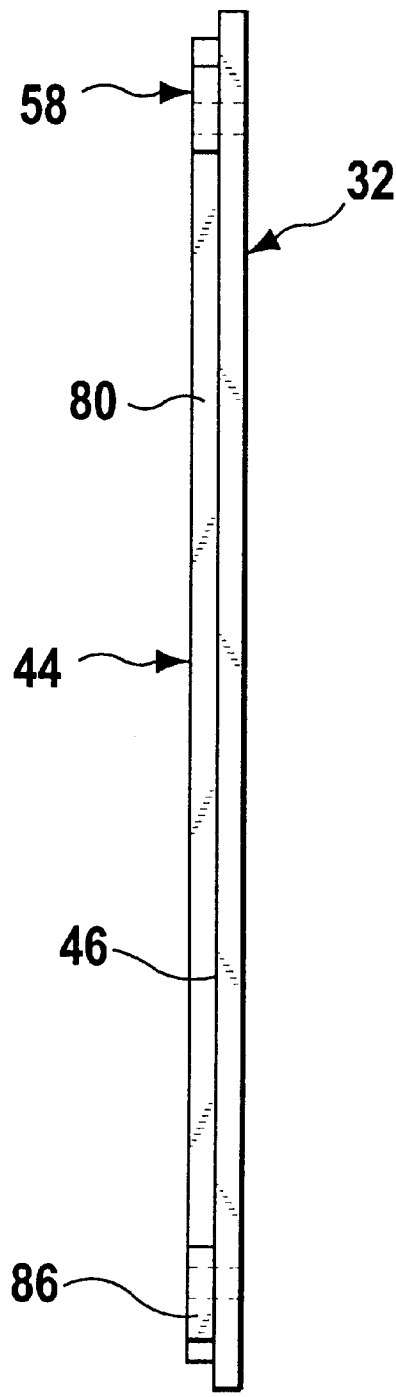
FIG. 12 is a side elevational view of the back cover plate taken in the direction of arrow 12 in FIG. 1.
Figure 13:
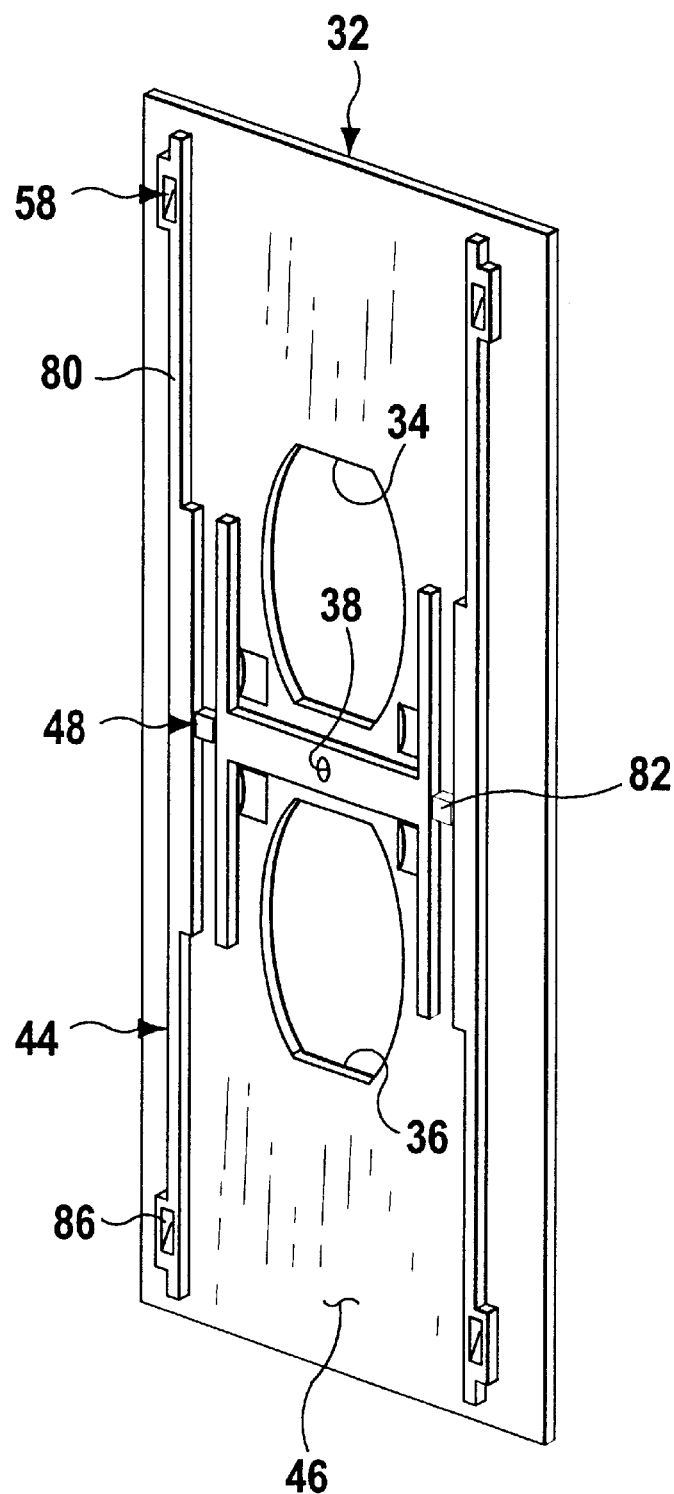
FIG. 13 is a front perspective view of the back cover plate.

Turning now descriptively to the drawings, in which similar reference characters denote similar elements throughout the several views, FIGS. 1 through 13 illustrate the present invention being a safety device 14. With regard to the reference numerals used, the following numbering is used throughout the various drawing figures.

| | |
|---|---|
| 14 | safety device |
| 16 | electrical outlet |
| 18 | outlet box of 16 in 20 |
| 20 | wall |
| 22 | receptacle of 16 in 18 |
| 24 | upper socket of 22 |
| 26 | lower socket of 22 |
| 28 | central threaded opening in 22 |
| 30 | cover plate screw |
| 32 | back cover plate of 14 |
| 34 | upper aperture in 32 |
| 36 | lower aperture in 32 |
| 38 | central hole in 32 |
| 40 | upper shield of 14 |
| 42 | lower shield of 14 |
| 44 | guiding structure of 14 |
| 46 | front face of 32 |
| 48 | biasing components of 14 |
| 50 | front cover plate of 14 |
| 52 | upper aperture in 50 |
| 54 | lower aperture in 50 |
| 56 | central hole in 50 |
| 58 | mating elements of 14 |
| 60 | upper shield engaging facility of 14 |
| 62 | lower shield engaging facility of 14 |
| 64 | shields locking components |
| 66 | shields releasing elements |

-continued

| 68  | shields retaining structures       |
| 70  | T-shaped slide panel for 40, 42    |
| 72  | tab of 70                          |
| 74  | main flat body of 70               |
| 76  | leg of 70                          |
| 78  | H-shaped cross member of 44        |
| 80  | guide rail of 44                   |
| 82  | stud of 48                         |
| 84  | spring of 48                       |
| 86  | small socket of 58                 |
| 88  | locking tab of 58                  |
| 90  | rear face of 50                    |
| 92  | depression in 40                   |
| 94  | front face of 40                   |
| 96  | vertical slot in 50                |
| 98  | depression in 42                   |
| 100 | front face of 42                   |
| 102 | vertical slot in 50                |
| 104 | hook end of 64 on 76               |
| 106 | raised protrusion of 64 on 90      |
| 108 | L-shaped tab of 66                 |
| 110 | first U-shaped tab of 68           |
| 112 | second U-shaped tap of 68          |
| 114 | horizontal depression in 40 of 68  |
| 116 | horizontal depression in 42 of 68  |

The safety device 14 is for an electrical outlet 16 of the type that includes an outlet box 18 in a wall 20 for maintaining a receptacle 22 having vertically aligned dual sockets 24, 26 and a central threaded opening 28 between the sockets 24, 26 for receiving a cover plate screw 30. The safety device 14 comprises a back cover plate 32, having a pair of vertically aligned apertures 34, 36 therethrough with a central hole 38 between the apertures 34, 36. The apertures 34, 36 are shaped and positioned to correspond to the dual sockets 24, 26. The central hole 38 is aligned with the central threaded opening 28 of the receptacle 22 in the outlet box 18, when the back cover plate 32 is positioned over the outlet box 18. A pair of shields 40, 42 are sized to obstruct the apertures 34, 36 in the back cover plate 32, to prevent access to the dual sockets 24, 26 of the receptacle 22.

A structure 44 on a front face 46 of the back cover plate 32 is for guiding the upper shield 40 to move upwardly away from the upper aperture 34 in the back cover plate 32 and the lower shield 42 to move downwardly away from the lower aperture 36 in the back cover plate 32. Components 48 are for biasing the shields 40, 42 on the front face 46 of the back cover plate 32, so as to normally position the shields 40, 42 to obstruct the apertures 34, 36 in the back cover plate 32. A front cover plate 50 has a pair of vertically aligned apertures 52, 54 therethrough with a central hole 56 between the apertures 52, 54. The apertures 52, 54 are shaped and positioned to correspond to the dual sockets 24, 26 while the central hole 56 is aligned with the central threaded opening 28 of the receptacle 22 in the outlet box 18. Elements 58 are for mating the front cover plate 50 to the back cover plate screw 32 over the shields 40, 42, so that the cover plate screw 30 can engage with the central threaded opening 28 in the receptacle 22, to hold the safety device 14 thereto.

A facility 60 is provided, for engaging the upper shield 40 through the upper aperture 52 in the front cover plate 50, so that the upper shield 40 can move upwardly away from the upper aperture 34 in the back cover plate 32, to expose the upper socket 24 of the receptacle 22. A facility 62 is also provided, for engaging the lower shield 42 through the lower aperture 54 in the front cover plate 50, so that the lower shield 42 can move downwardly away from the lower aperture 36 in the back cover plate 32, to expose the lower socket 26 of the receptacle 22.

The safety device 14 for the electrical outlet 16 further includes components 64 on the front cover plate 50, for locking each of the shields 40, 42 in the normally obstructing positions. Elements 66 on the front cover plate 50 are for releasing each of the shields 40, 42 from the normally obstructing positions. Structures 68 on the front cover plate 50 are for retaining each of the shields 40, 42 away from the sockets 24, 26 of the receptacle 22, so that an electrical plug (not shown) can engage with each of the sockets 24, 26 of the receptacle 22. Each shield 40, 42 is a T-shaped slide panel 70, having a pair of outwardly extending tabs 72 and a main flat body 74 with a pair of integral parallel legs 76, in which each leg 76 extends from one tab 72 adjacent the main flat body 74.

The guiding structure 44 consists of an H-shaped cross member 78 integrally formed centrally on the front face 46 of the back cover plate 32. A pair of vertically spaced apart side guide rails 80 are integrally formed on the front face 46 of the back cover plate 32 on opposite sides of the H-shaped cross member 78. The biasing components 48 include two studs 82 integrally formed on the front face 46 of the back cover plate 32. Four springs 84 are provided. Two springs 84 are connected between the upper shield 40 and the two studs 82, while other two springs 84 are connected between the lower shield 42 and the two studs 82.

The mating elements 58 are four small sockets 86 integrally formed on the front face 46 of the back cover plate 32 at the corners thereof. Four locking tabs 88 are integrally formed on a rear face 90 of the front cover plate 50 at the corners thereof, so that the locking tabs 88 can engage with the small sockets 86.

The upper shield engaging facility 60 includes the upper shield 40 having three depressions 92 in a front face 94 thereof simulating a hot slot, neutral slot and ground slot of the upper socket 24 of the receptacle 22, for engagement by the hot blade, neutral blade and ground prong of an electrical plug. The front cover plate 50 has three vertical slots 96 extending upwardly from the upper aperture 52 and in alignment with the three depressions 92 in the upper shield 40, to allow the electrical plug to raise the upper shield 40 to its uppermost position.

The lower shield engaging facility 62 consists of the lower shield 42 having three depressions 98 in a front face 100 thereof simulating a hot slot, neutral slot and ground slot of the lower socket 26 of the receptacle 22, for engagement by the hot blade, neutral blade and ground prong of an electrical plug. The front cover plate 50 has three vertical slots 102 extending downwardly from the lower aperture 54 and in alignment with the three depressions 98 in the lower shield 42, to allow the electrical plug to lower the lower shield 42 to its lowermost position.

The shields locking components 64 comprises the legs 76 of the shields 40, 42 having hook ends 104. Four sets of two raised protrusions 106 are integrally formed on the rear face 90 of the front cover plate 50 above and below the apertures 52, 54 which engages with the hook ends 104.

The shields releasing structures 66 include the front cover plate 50 having four L-shaped tabs 108 cut therethrough above and below the apertures 52, 54. Each L-shaped tab 108 is in front of the two raised protrusions 106. When two of the L-shaped tabs 108 above and below the apertures 52, 54 are simultaneously manually depressed inwardly, the two hook ends 104 of the two legs 76 of one shield 40 or 42 will disengage from the raised protrusions 106. The shield 40 or 42 can be moved away from the respective aperture 52 or 54 in the front cover plate 50 and the respective aperture 34 or 36 in the back cover plate plate 32 by an electrical plug, to expose the respective sockets 24 or 26 of the receptacle 22.

The shields retaining structures 68 include the front cover plate 50 having two U-shaped tabs 110, 112 cut therethrough. The first U-shaped tab 110 is located centrally adjacent a top edge and the second U-shaped tab 112 is located centrally adjacent a bottom edge. The upper shield 40 has a horizontal depression 114 in the front face 94 at a top end. The lower shield 42 has a horizontal depression 116 in the front face 100 at a bottom end. When the upper shield 40 is moved to its uppermost position, the first U-shaped tab 110 can be manually depressed into the horizontal depression 114 of the upper shield 40, to keep the upper shield 40 raised. When the lower shield 42 is moved to its lowermost position, the second U-shaped tab 112 can be manually depressed into the horizontal depression 116 of the lower shield 42, to keep the lower shield 42 lowered.

It will be understood that each of the elements described above, or two or more together may also find a useful application in other types of methods differing from the type described above.

While certain novel features of this invention have been shown and described are pointed out in the annexed claims, it is not intended to be limited to the details above, since it will be understood that various omissions, modifications, substitutions and changes in the forms and details of the device illustrated and in its operation can be made by those skilled in the art without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed is new and desired to be protected by Letters Patent is set forth in the appended claims:

1. A safety device for an electrical outlet of the type including an outlet box in a wall for maintaining a receptacle having vertically aligned dual sockets, the dual sockets including an upper socket and a lower socket, and a central threaded opening between the sockets for receiving a cover plate screw, said safety device comprising:
    a) a back cover plate having upper and lower vertically aligned apertures therethrough with a central hole between said apertures, said apertures being shaped and positioned to correspond to the upper and lower sockets, while said central hole is aligned with the central threaded opening of the receptacle in the outlet box, when said back cover plate is positioned over the outlet box;
    b) upper and lower shields sized to obstruct said apertures in said back cover plate, to prevent access to the upper and lower sockets of the receptacle;
    c) means on a front face of said back cover plate for guiding said upper shield to move upwardly away from said upper aperture in said back cover plate, and said lower shield to move downwardly away from said lower aperture in said back cover plate;
    d) means for biasing said shields on said front face of said back cover plate, so as to normally position said shields to obstruct said apertures in said back cover plate;
    e) a front cover plate having a pair of vertically aligned apertures therethrough with a central hole between said apertures, said apertures being shaped and positioned to correspond to the upper and lower sockets, while said central hole is aligned with the central threaded opening of the receptacle in the outlet box;
    f) means for mating said front cover plate to said back cover plate over said shields, so that the cover plate screw can engage with the central threaded opening in the receptacle to hold said safety device thereto;
    g) means for engaging said upper shield through said upper aperture in said front cover plate, so that said upper shield can move upwardly away from said upper aperture in said back cover plate to expose the upper socket of the receptacle; and
    h) means for engaging said lower shield through said lower aperture in said front cover plate, so that said lower shield can move downwardly away from said lower aperture in said back cover plate to expose the lower socket of the receptacle, wherein each said shield is a T-shaped slide panel having a pair of outwardly extending tabs and a main flat body with a pair of integral parallel legs in which each of said legs extends from one said tab adjacent said main flat body.

2. A safety device for an electrical outlet as recited in claim 1, wherein said mating means includes:
    a) four small sockets integrally formed on said front face of said back cover plate at corners thereof; and
    b) four locking tabs integrally formed on a rear face of said front cover plate at the corners thereof, so that said locking tabs can engage with small sockets.

3. A safety device for an electrical outlet as recited in claim 1, wherein said shields locking means includes:
    a) said legs of said shields having hook ends; and
    b) four sets of two raised protrusions integrally formed on a rear face of said front cover plate above and below said apertures which engages with said hook ends.

4. A safety device for an electrical outlet as recited in claim 3, wherein said shields releasing means includes said front cover plate having four L-shaped tabs cut therethrough above and below said apertures, whereby each of said L-shaped tabs is in front of said two raised protrusions, so that when two of said L-shaped tabs above and below said apertures are simultaneously manually depressed inwardly said hook ends of said two legs of one of said shields will disengage from said raised protrusions, so that said one of said shields can be moved away from said respective aperture in said front cover plate and said respective aperture in said back cover plate by said electrical plug to expose the respective sockets of the receptacle.

5. A safety device for an electrical outlet as recited in claim 3, wherein said shields retaining means includes:
    a) said front cover plate having first and second U-shaped tabs cut therethrough, in which said first U-shaped tab is located centrally adjacent a top edge and said second U-shaped tab is located centrally adjacent a bottom edge; and
    b) said upper shield having a horizontal depression in a front face at a top end and said lower shield having a horizontal depression in a front face at a bottom end, so that when said upper shield is moved to its uppermost position said first U-shaped tab can be manually depressed into said horizontal depression of said upper shield to keep said upper shield raised, and when said lower shield is moved to its lowermost position said second U-shaped tab can be manually depressed into said horizontal depression of said lower shield, to keep said lower shield lowered.

6. A safety device for an electrical outlet of the type including an outlet box in a wall for maintaining a receptacle having vertically aligned dual sockets, the dual sockets including an upper socket and a lower socket, and a central threaded opening between the sockets for receiving a cover plate screw, said safety device comprising:

a) a back cover plate having upper and lower vertically aligned apertures therethrough with a central hole between said apertures, said apertures being shaped and positioned to correspond to the upper and lower sockets, while said central hole is aligned with the central treaded opening of the receptacle in the outlet box, when said back cover plate is positioned over the outlet box;

b) upper and lower shields sized to obstruct said apertures in said back cover plate, to prevent access to the upper and lower sockets of the receptacle;

c) means on a front face of said back cover plate for guiding said upper shield to move upwardly away from said upper aperture in said back cover plate, and said lower shield to move downwardly away from said lower aperture in said back cover plate, wherein said guiding means includes an H-shaped cross member integrally formed centrally on said front face of said back cover plate; and a pair of vertically spaced apart side guide rails integrally formed in said front face of said back cover plate on opposite sides of said H-shaped cross member;

d) means for biasing said shields on said front face of said back cover plate, so as to normally position said shields to obstruct said apertures in said back cover plate;

e) a front cover plate having a pair of vertically aligned apertures therethrough with a central hole between said apertures, said apertures being shaped and positioned to correspond to the upper and lower sockets, while said central hole is aligned with the central threaded opening of the receptacle in the outlet box;

f) means for mating said front cover plate to said back cover plate over said shields, so that the cover plate screw can engage with the central threaded opening in the receptacle to hold said safety device thereto;

g) means for engaging said upper shield through said upper aperture in said front cover plate, so that said upper shield can move upwardly away from said upper aperture in said back cover plate to expose the upper socket of the receptacle; and h) means for engaging said lower shield through said lower aperture in said front cover plate, so that said lower shield can move downwardly away from said lower aperture in said back cover plate to expose the lower socket of the receptacle.

7. A safety device for an electrical outlet of the type including an outlet box in a wall for maintaining a receptacle having vertically aligned dual sockets, the dual sockets including an upper socket and a lower socket, and a central threaded opening between the sockets for receiving a cover plate screw, said safety device comprising:

a) a back cover plate having upper and lower vertically aligned apertures therethrough with a central hole between said apertures, said apertures being shaped and positioned to correspond to the upper and lower sockets, while said central hole aligned with the central threaded opening of the receptacle in the outlet box, when said back cover plate is positioned over the outlet box;

b) upper and lower shields sized to obstruct said apertures in said back cover plate, to prevent access to the upper and lower sockets of the receptacle;

c) means on a front face of said back cover plate for guiding said upper shield to move upwardly away from said upper aperture in said back cover plate, and said lower shield to move downwardly away from said lower aperture in said back cover plate;

d) means for biasing said shields on said front face of said back cover plate, so as to normally position said shields to obstruct said apertures in said back cover plate, wherein said biasing means includes two studs integrally formed in said front face of said back cover plate; and four springs in which two said springs are connected between said upper shield and said two studs, while other two said springs are connected between said lower shield and said two studs;

e) a front cover plate having a pair of vertically aligned apertures therethrough with a central hole between said apertures, said apertures being shaped and positioned to correspond to the upper and lower sockets, while said central hole aligned with the central treaded opening of the receptacle in the outlet box;

f) means for mating said front cover plate to said back cover plate over said shields, so that the cover plate screw can engage with the central threaded opening in the receptacle to hold said safety device thereto;

g) means for engaging said upper shield through said upper aperture in said front cover plate, so that said upper shield can move upwardly away from said upper aperture in said back cover plate to expose the upper socket of the receptacle; and h) means for engaging said lower shield through said lower aperture in said front cover plate, so that said lower shield can move downwardly away from said lower aperture in said back cover plate to expose the lower socket of the receptacle.

8. A safety device for an electrical outlet of the type including an outlet box in a wall for maintaining a receptacle having vertically aligned dual sockets, the dual sockets including an upper socket and a lower socket, and a central threaded opening between the sockets for receiving a cover plate screw, said safety device comprising:

a) a back cover plate having upper and lower vertically aligned apertures therethrough with a central hole between said apertures, said apertures being shaped and positioned to correspond to the upper and lower sockets, while said central hole aligned with the central threaded opening of the receptacle in the outlet box, when said back cover plate is positioned over the outlet box;

b) upper and lower shields sized to obstruct said apertures in said back cover plate, to prevent access to the upper and lower sockets of the receptacle;

c) means on a front face of said back cover plate for guiding said upper shield to move upwardly away from said upper aperture in said back cover plate, and said lower shield to move downwardly away from said lower aperture in said back cover plate;

d) means for biasing said shields on said front face of said back cover plate, so as to normally position said shields to obstruct said apertures in said back cover plate;

e) a front cover plate having a pair of vertically aligned apertures therethrough with a central bole between said apertures, said apertures being shaped and positioned to correspond to the upper and lower sockets, while said central hole aligned with the central threaded opening of the receptacle in the outlet box;

f) means for mating said front cover plate to said back cover plate over said shields, so that the cover plate screw can engage with the central threaded opening in the receptacle to hold said safety device thereto;

g) means for engaging said upper shield through said upper aperture in said front cover plate, so that said upper shield can move upwardly away from said upper aperture in said back cover plate to expose the upper socket of the receptacle, wherein said upper shield engaging means includes said upper shield having three depressions in a front face thereof simulating a hot slot, neutral slot and ground slot of the upper socket of the receptacle, for engagement by a hot blade, neutral blade and ground prong of an electrical plug; and said front cover plate having three vertical slots extending upwardly from said upper aperture and in alignment with said three depressions in said upper shield, to allow the electrical plug to raise said upper shield to its uppermost position; and h) means for engaging said lower shield through said lower aperture in said front cover plate, so that said lower shield can move downwardly away from said lower aperture in said back cover plate to expose the lower socket of the receptacle.

9. A safety device for an electrical outlet of the type including an outlet box in a wall for maintaining a receptacle having vertically aligned dual sockets, the dual socket including an upper socket and a lower socket, and a central threaded opening between the sockets for receiving a cover plate screw, said safety device comprising:

a) a back cover plate having upper and lower vertically aligned apertures therethrough with a central hole between said apertures, said apertures being shaped and positioned to correspond to the upper and lower sockets, while said central hole aligned with the central threaded opening of the receptacle in the outlet box, when said back cover plate is positioned over the outlet box;

b) upper and lower shields sized to obstruct said apertures in said back cover plate, to prevent access to the upper and lower sockets of the receptacle;

c) means on a front face of said back cover plate for guiding said upper shield to move upwardly away from said upper aperture in said back cover plate, and said lower shield to move downwardly away from said lower aperture in said back cover plate;

d) means for biasing said shields on said front face of said back cover plate, so as to normally position said shields to obstruct said apertures in said back cover plate;

e) a front cover plate having a pair of vertically aligned apertures therethrough with a central hole between said apertures, said apertures being shaped and positioned to correspond to the upper and lower sockets, while said central hole aligned with the central threaded opening of the receptacle in the outlet box;

f) means for mating said front cover plate to said back cover plate over said shields, so that the cover plate screw can engage with the central threaded opening in the receptacle to hold said safety device thereto;

g) means for engaging said upper shield through sad upper aperture in said front cover plate, so that said upper shield can move upwardly away from said upper aperture in said back cover plate to expose the upper socket of the receptacle; and h) means for engaging said lower shield through said lower aperture in said front cover plate, so that said lower shield can move downwardly away from said lower aperture in said back cover plate to expose the lower socket of the receptacle, wherein said lower shield engaging means includes said lower shield having three depressions in a front face thereof simulating a hot slot, neutral slot and ground slot of the lower socket of the receptacle, for engagement by a hot blade, neutral blade and ground prong of an electrical plug; and said front cover plate having three vertical slots extending downwardly from said lower aperture and in alignment with said three depressions in said lower shield to allow the electrical plug to lower said lower shield to its lowermost position.

10. A safety device for an electrical outlet of the type including an outlet box in a wall for maintaining a receptacle having vertically aligned dual sockets, the dual sockets including an upper socket and a lower socket, and a central threaded opening between the sockets for receiving a cover plate screw, said safety device comprising:

a) a back cover plate having upper and lower vertically aligned apertures therethrough with a central hole between said apertures, said apertures being shaped and positioned to correspond to the upper and lower sockets, while said central hole aligned with the central threaded opening of the receptacle in the outlet box, when said back cover plate is positioned over the outlet box;

b) upper and lower shields sized to obstruct said apertures in said back cover plate, to prevent access to the upper and lower sockets of the receptacle;

c) means on a front face of said back cover plate for guiding said upper shield to move upwardly away from said upper aperture in said back cover plate, and said lower shield to move downwardly away from said lower aperture in said back cover plate;

d) means for biasing said shields on said front face of said back cover plate, so as to normally position said shields to obstruct said apertures in said back cover plate;

e) a front cover plate having a pair of vertically aligned apertures therethrough with a central hole between said apertures, said apertures being shaped and positioned to correspond to the upper and lower sockets, while said central hole aligned with the central threaded opening of the receptacle in the outlet box;

f) means for mating said front cover plate to said back cover plate over said shields, so that the cover plate screw can engage with the central threaded opening in the receptacle to hold said safety device thereto;

g) means for engaging said upper shield through said upper aperture in said front cover plate, so that said upper shield can move upwardly away from said upper aperture in said back cover plate to expose the upper socket of the receptacle;

h) means for engaging said lower shield through said lower aperture in said front cover plate, so that said lower shield can move downwardly away from said lower aperture in said back cover plate to expose the lower socket of the receptacle;

i) means on said front cover plate for locking each of said shields in the normally obstructing positions;

j) means on said front cover plate for releasing each of said shields from the normally obstructing positions; and k) means on said front cover plate for retaining each of said shields away from the sockets of the receptacle, so that an electrical plug can engage with each of the socket of the receptacle.

11. A safety device for an electrical outlet as recited in claim 10, wherein each of said shields is a T-shaped slide panel having a pair of outwardly extending tabs and a main flat body with a pair of integral parallel legs in which each of said leg extends from one of said tabs adjacent said main flat body.

12. A safety device for an electrical outlet as recited in claim 11, wherein said guiding means includes:

a) an H-shaped cross member integrally formed centrally on said front face of said back cover plate; and b) a pair of vertically spaced apart side guide rails integrally formed on said front face of said back cover plate on opposite sides of said H-shaped cross member.

13. A safety device for an electrical outlet as recited in claim 12, wherein said biasing means includes:

a) two studs integrally formed on said front face of said back cover plate; and b) four springs in which two said springs are connected between said upper shield and said two studs, while other two said springs are connected between said lower shield and said two studs.

14. A safety device for an electrical outlet as recited in claim 13, wherein said mating means includes:

a) four small sockets integrally formed on said front face of said back cover plate at corners thereof; and b) four locking tabs integrally formed on a rear face of said front cover plate at the corners thereof, so that said locking tabs can engage with small sockets.

15. A safety device for an electrical outlet as recited in claim 14, wherein said upper shield engaging means includes:

a) said upper shield having three depressions in a front face thereof simulating a hot slot, neutral slot and ground slot of the upper socket of the receptacle, for engagement by a hot blade, neutral blade and ground prong of an electrical plug; and b) said front cover plate having three vertical slots extending upwardly from said upper aperture and in alignment with said three depressions in said upper shield, to allow the electrical plug to raise said upper shield to its uppermost position.

16. A safety device for an electrical outlet as recited in claim 15, wherein said lower shield engaging means includes:

a) said lower shield having three depressions in a front face thereof simulating a hot slot, neutral slot and ground slot of the lower socket of the receptacle, for engagement by the hot blade, neutral blade and ground prong of an electrical plug; and b) said front cover plate having three vertical slots extending downwardly from said lower aperture and in alignment with said three depressions in said lower shield to allow the electrical plug to lower said lower shield to its lowermost position.

17. A safety device for an electrical outlet as recited in claim 16, wherein said shields locking means includes:

a) said legs of said shields having hook ends; and b) four sets of two raised protrusions integrally formed on a rear face of said front cover plate above and below said apertures which engages with said hook ends.

18. A safety device for an electrical outlet as recited in claim 17, wherein said shields releasing means includes said front cover plate having four L-shaped tabs cut therethrough above and below said apertures, whereby each of said L-shaped tabs is in front of said two raised protrusions, so that when two of said L-shaped tabs above and below said apertures are simultaneously manually depressed inwardly said hook ends of said two legs of one of said shields will disengage from said two raised protrusions, so that said one of said shields can be moved away from respective aperture in said front cover plate and said respective aperture in said back cover plate by said electrical plug to expose respective sockets of the receptacle.

19. A safety device for an electrical outlet as recited in claim 18, wherein said shields retaining means includes:

a) said front cover plate having first and second U-shaped tabs cut therethrough, in which said first U-shaped tab is located centrally adjacent a top edge and said second U-shaped tab is located centrally adjacent a bottom edge; and b) said upper shield having a horizontal depression in a front face at a top end and said lower shield having a horizontal depression in a front face at a bottom end, so that when said upper shield is moved to its uppermost position said first U-shaped tab can be manually depressed into said horizontal depression of said upper shield to keep said upper shield raised, and when said lower shield is moved to its lowermost position said second U-shaped tab can be manually depressed into said horizontal depression of said lower shield, to keep said lower shield lowered.

* * * * *